UNITED STATES PATENT OFFICE.

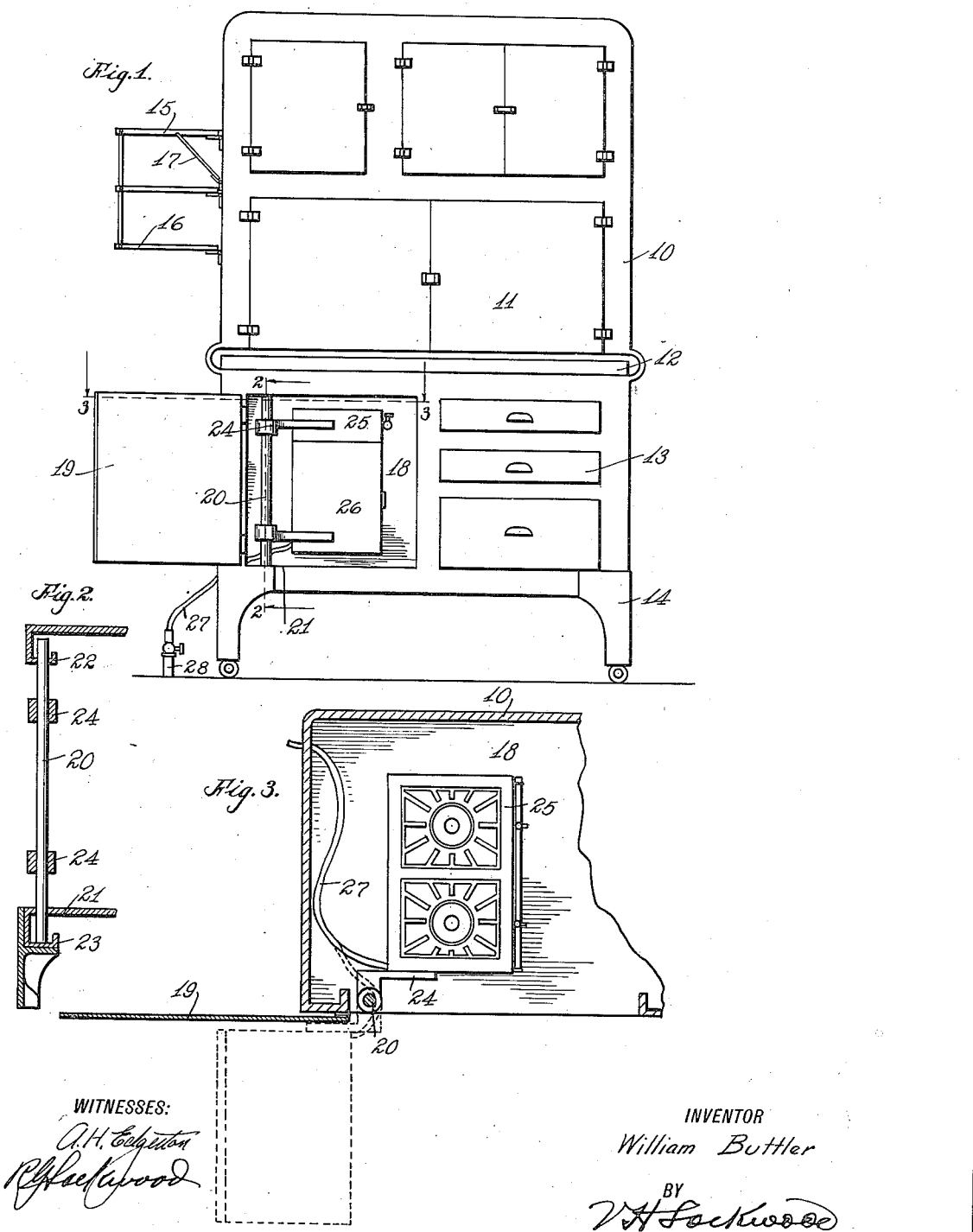

WILLIAM BUTTLER, OF INDIANAPOLIS, INDIANA.

COMBINATION KITCHEN-CABINET AND STOVE.

1,153,597. Specification of Letters Patent. Patented Sept. 14, 1915.

Application filed January 16, 1915. Serial No. 2,675.

*To all whom it may concern:*

Be it known that I, WILLIAM BUTTLER, a citizen of the United States, and a resident of Indianapolis, county of Marion, and State of Indiana, have invented a certain new and useful Combination Kitchen-Cabinet and Stove; and I do hereby declare that the following is a full, clear, and exact description thereof, reference being had to the accompanying drawings, in which like letters refer to like parts.

The object of this invention is to provide a compact kitchen cabinet and stove. It is to provide a means within the kitchen cabinet of concealing the cook stove when not in use thereby saving space in the kitchen and having the cook stove out of sight and making it more convenient to use because of its connection with the kitchen cabinet.

This invention consists of the ordinary kitchen cabinet having a compartment in the lower portion thereof in which a gas or electric stove may swing when not in use. This compartment is closed by a door which entirely conceals the stove from view.

The full nature of the invention will be understood from the accompanying drawings and further description and claim.

Figure 1 is a front elevation of the kitchen cabinet with the stove in place and a door swung open. Fig. 2 is a cross section on line 2—2 of Fig. 1. Fig. 3 is a plan view looking down on the cook stove taken on line 3—3 of Fig. 1.

There is a kitchen cabinet 10 of the ordinary type with compartments 11 for storing foods; sliding shelf 12, drawers 13 and legs 14. On the side of the cabinet there are shelves 15 and 16 which may be folded down out of the way or held in place by brace 17 when it is necessary to use them. There is a compartment 18 having its upper end and lower walls formed of sheet metal with their corresponding lateral edges turned downward, then inward and upward to form substantially L-shaped flanges or lips 22 and 23. Said compartment has a hinged door 19 and a rod 20 passing through the floor 21, the lip 22 and resting on the lip 23 so as to turn freely thereon. There are arms 24 rigidly attached to said rod and supporting thereon the cook stove 25 and oven 26. Loosely attached to the cook stove there may be a flexible tube or wires 27 connected to the gas or electric conduit 28.

When it is desired to use the stove the door of the compartment containing it is opened and the stove is pulled out to the position shown by dotted lines in Fig. 3. It may be swung back into the compartment and the door closed when it is not in use and thereby it is removed from view and out of the way.

The invention claimed is:

A kitchen cabinet including a stove compartment with the upper and lower walls thereof formed of sheet metal with the corresponding lateral edges thereof turned downward to form flanges substantially L-shaped in cross section, a vertical pivot rod in said compartment with the upper end loosely projecting through the lower part of the upper flange and the lower end projecting through the bottom of the compartment and supported by the lower part of the lower flange, and a stove mounted on said pivot rod so that the stove can be folded into or swung out of said compartment.

In witness whereof, I have hereunto affixed my signature in the presence of the witnesses herein named.

WILLIAM BUTTLER.

Witnesses:
J. H. WELLS,
R. A. LOCKWOOD.